Aug. 14, 1934.      A. SCHRADER      1,969,859
PLOW
Filed March 21, 1932      2 Sheets-Sheet 1
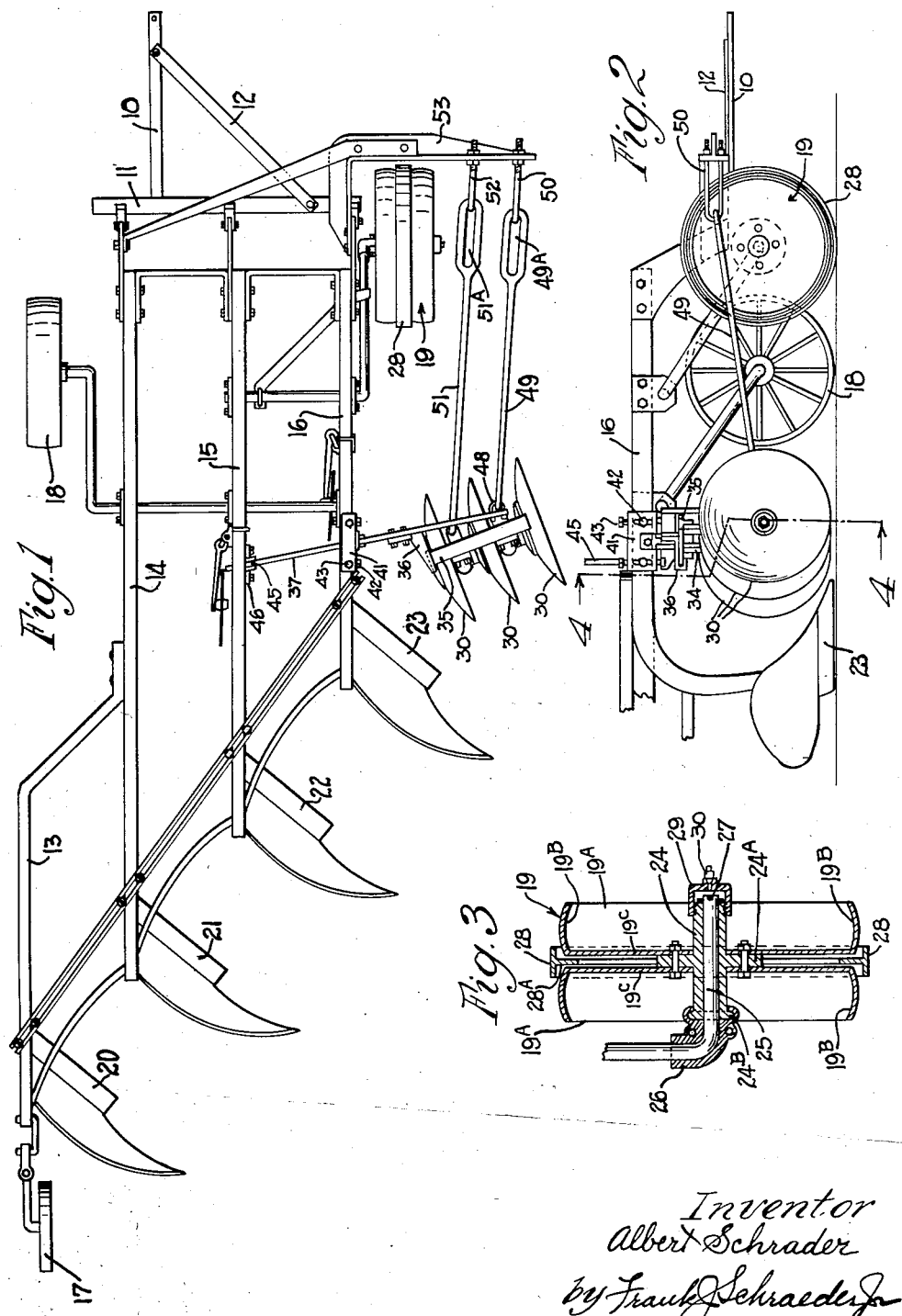

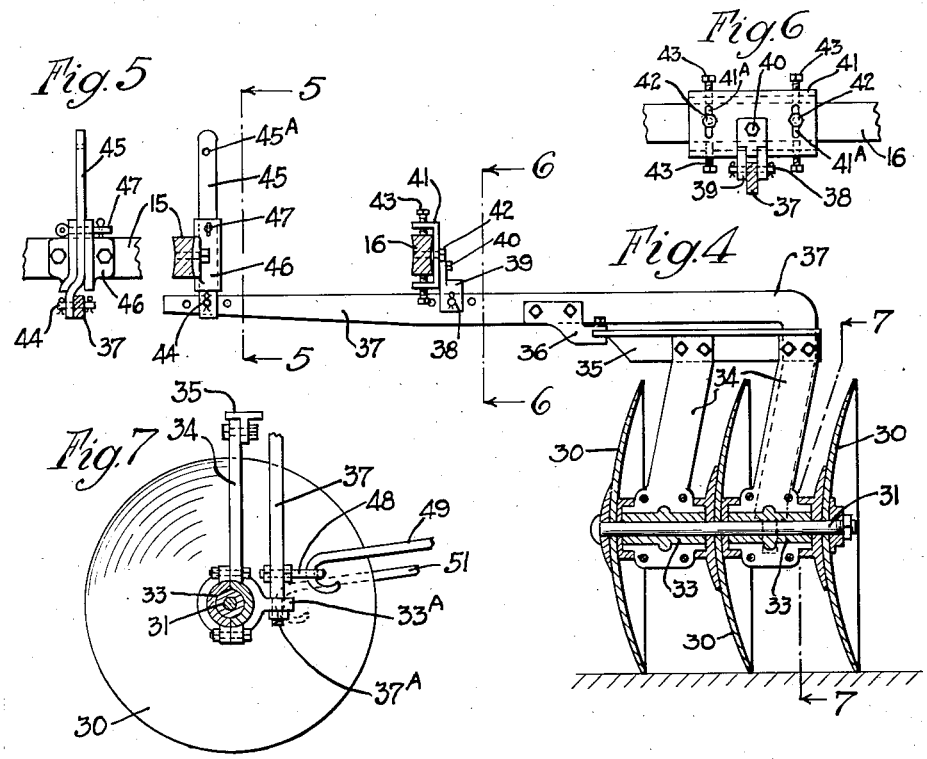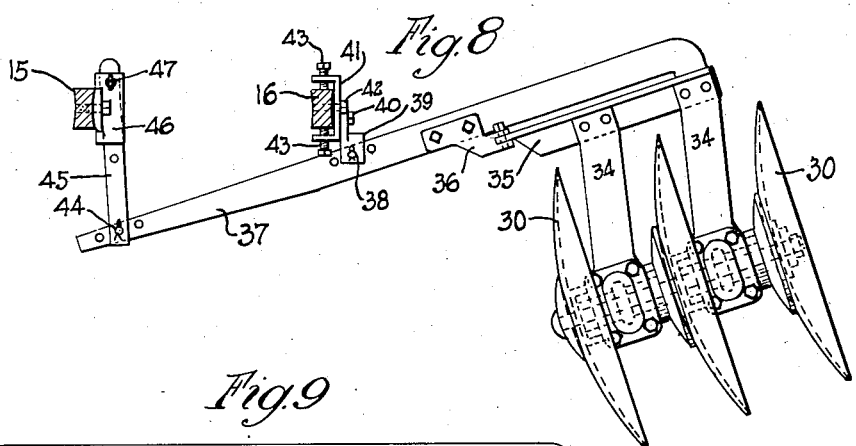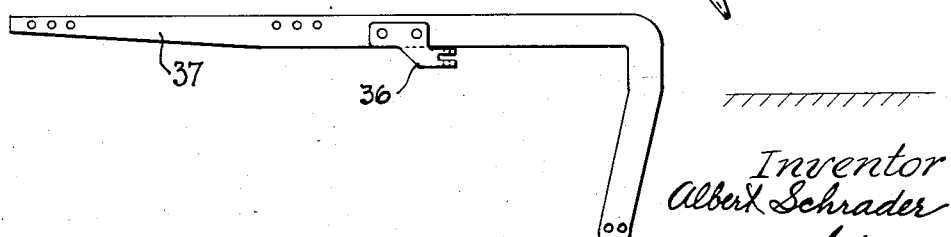

Patented Aug. 14, 1934

1,969,859

UNITED STATES PATENT OFFICE 1,969,859

PLOW

Albert Schrader, Timken, Kans.

Application March 21, 1932, Serial No. 600,177

5 Claims. (Cl. 97—6)

This invention relates generally to plows and has particular reference to a plow attachment for gang plows to facilitate the plowing of corners of fields.

The invention is especially adaptable for use in connection with tractor-drawn plows and has among its objects to provide a novel gang disc attachment particularly for mold-board type of plows.

Another object of the invention is to provide an attachment of the character described which is simple in design, rigid and durable in construction, and which embodies the necessary flexibility for satisfactory operation.

With the above and other objects in view, my invention consists of the novel construction, arrangement and combination of the various parts and members shown in preferred embodiment in the attached drawings, described in the following specifications and particularly pointed out in the appended claims.

Referring to the drawings:

Fig. 1 is a plan view of a tractor-drawn gang plow embodying my invention.

Fig. 2 is a side elevation of the portion of the plow embodying my invention.

Fig. 3 is a vertical section taken through my improved supporting wheel on the vertical center line.

Fig. 4 is a vertical section taken on line 4—4 of Fig. 2, showing the support for the gang of disc plows.

Fig. 5 is a section taken on line 5—5 of Fig. 4.

Fig. 6 is a section taken on line 6—6 of Fig. 4.

Fig. 7 is a section taken on line 7—7 of Fig. 4.

Fig. 8 is a side elevation of the gang disc in raised position.

Fig. 9 is a side elevation of the pivotally mounted raising and lowering bar for the gang of disc plows.

In the drawings and referring to Figs. 1 to 9, inclusive, a hitch is provided which consists of a draw bar 10 connected at one end to a tractor machine in any suitable manner, and at the other end to a cross bar 11. A brace 12 may be provided between the draw bar and cross bar. The hitch is suitably connected to the plow beams 14, 15 and 16, which together with beam 13 form a frame which is provided with a supporting caster wheel 17 and additional supporting wheels 18 and 19.

The beams 13, 14, 15 and 16, support respectively the plow bottoms 20, 21, 22 and 23.

In the new and novel plow design shown on the attached drawings, the supporting wheel 19, is of special design as clearly indicated in Figs. 1, 2 and 3, and comprises a pair of spaced members 19$^A$ each consisting of a circular flange 19$^B$ of arcuate cross-section formed on the inner side with an integral flange 19$^C$. The flanges 19$^C$ are bolted to the sides of a flange 24$^A$ which is formed integrally with the intermediate portion of the hub 24, into which the lateral portion of the axle 25 is extended and on which the hub is rotatably mounted.

The hub 24 is provided with a flange 24$^B$ which is retained in the collar 26 against movement off the shaft 25. A pin 27 in the end of the shaft 25 acts as an additional confining element for the hub 24.

A ring 28 is loosely positioned around the periphery of the circular members 19$^A$. The ring 28 is formed with preferably an integral inwardly disposed flange 28$^A$ which extends into the space between the flanges 19$^C$ to thereby retain the ring 28 against cross-displacement from the periphery of the wheel.

This loose ring 28 which is substantially of T cross-section acts to keep the wheel 19 free or clear of caked mud or ground.

As a grease retainer for the hub 24, I provide a cap 29 which is screw-mounted on the outer end of the hub 24 and provided with a suitable grease valve 29$^A$.

The gang-disc corner plow comprises a plurality of discs 30 which are mounted for rotation with a common shaft 31 in a pair of bearings 33 supported in the lower ends of the standards 34. The upper ends of the standards 34 are securely bolted to a T iron or member 35, one end of which is supported in the casting or bracket 36 which is securely bolted to the disc supporting member or bar 37 which is pivotally supported on pin 38 in bracket 39.

The bracket 39 is mounted on a bolt 40 which extends into the channeled support 41 adjustably mounted on the beam 16.

The beam 16 is provided with a pair of stud bolts 42 which extend through the slotted holes 41$^A$ of the support 41 to afford vertical adjustment of the support 41 and the bracket 39 relatively to the beam 16. The proper vertical position of the support 41 is maintained by means of four setscrews 43. Thus, the pivotal support of the disc supporting bar 37 is readily vertically adjustable relatively to the beam 16.

The inner end of the disc supporting bar 37 is connected by a breakable safety pin 44 to one side of the lower end of an operating bar 45 which is vertically slidably mounted in a bracket member 46 and held against vertical displacement by a pin 47. The bracket 46 is suitably mounted to the beam 15.

It will now be readily seen from Figs. 4, 5, and 6, that to raise the gang of discs it is only necessary to remove pin 47, push the bar 45 downwardly until the hole 45A registers with the opening for the pin 47 and reinsert pin 47 to retain the operating end of the bar 37 in lowered position with its opposite end and gang of discs in raised position, as shown by Fig. 8.

It will be noted that the gang of discs is so supported on the bracket 39 and on the lower end of the operating bar 45, that a measure of protection is afforded for the gang of discs in case the discs strike a rock or tough gumbo by permitting the pin 44 to break or the bar 37 to move sidewise away from its supporting operating bar 45.

The outer end of the bar 37 is bent downwardly and is provided with a threaded stud 37A for connection to an ear 33A formed integrally with the outer bearing 33, as shown in Figs. 7 and 9.

The lower end of the bar 37 is also provided with a U-bolt 48 for connection with the hooked end of a pull-rod 49 the opposite end of which is provided with an open loop 49A for connection with a U-bolt 50.

A second pull-rod 51 is provided which is connected with its hooked end to the ear of the inner bearing 33. The pull-rod 51 is also formed with an open loop 51A for connection with a U-bolt 52.

The U-bolts 50 and 52 are provided with sufficient threads at their ends to afford suitable adjustment of the pull-rods 49 and 51 in the supporting member 53 which is fixed to the forward end of the plow.

From the above it will be observed that I have provided a novel corner plow to facilitate the plowing of corners which under ordinary operations cannot be plowed by a tractor-drawn plow.

I claim:

1. A corner plow attachment for tractor-drawn gang plows comprising a pivotally mounted supporting member, a plurality of rotatably mounted disc plows supported at one end of said supporting member, means including a movable member for moving said supporting member to thereby raise and lower said disc plows, means cooperating with said movable member for retaining said supporting member in position whereby said plurality of disc plows are held in either raised or lowered position, and means connected with the forward end of the gang plow and said plurality of disc plows adapted to retain said plurality of disc plows in alignment relatively to the longitudinally extending plow beams during the plowing operation.

2. A corner plow attachment for tractor-drawn gang plows as embodied in claim 1, and including said alignment retaining means adjustable longitudinally between its ends and arranged to permit the raising of said plurality of disc plows during its connection therewith.

3. A corner plow attachment as embodied in claim 1, wherein said alignment retaining means includes a tension bar instrumentality which is normally fixed as to the length thereof but arranged to permit vertical movement of the disc plows.

4. A corner disc plow attachment as embodied in claim 1, wherein said pivotally mounted supporting member comprises a bar normally laterally disposed during corner plowing operation and having one end bent downwardly and at its terminus connected to said plurality of disc plows, and wherein said plurality of disc plows include a rotatable support, a plurality of bearings for said rotatable support, a standard extending upwardly from each bearing, and means connecting the upper ends of said standards with said supporting member.

5. A corner disc plow attachment for tractor-drawn gang plows as embodied in claim 1, and including a pivotal support for said pivotally mounted supporting member mounted on one of the plow beams of the gang plow, and means for retaining one end of said supporting member in raised or lowered position mounted on another plow beam, said retaining means being adapted to be released from engagement with said supporting member under undue stress against the plurality of disc plows.

ALBERT SCHRADER.